(12) United States Patent
Van Gorp et al.

(10) Patent No.: US 8,527,748 B2
(45) Date of Patent: Sep. 3, 2013

(54) SYSTEM AND METHOD FOR HOSTING ENCRYPTED MONITORING DATA

(75) Inventors: John C. Van Gorp, Sidney (CA); Timothy Troy Slatton, Nashville, TN (US); Malachi Brown, Hermitage, TN (US); Jarrod Henry, LaVergne, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 358 days.

(21) Appl. No.: 12/896,256

(22) Filed: Oct. 1, 2010

(65) Prior Publication Data

US 2012/0084554 A1 Apr. 5, 2012

(51) Int. Cl.
*H04L 29/06* (2006.01)

(52) U.S. Cl.
USPC ........... 713/150; 713/189; 713/190; 713/191; 713/192; 726/1; 726/38; 711/163; 711/164

(58) Field of Classification Search
USPC ................................ 713/189, 150; 726/1–36
See application file for complete search history.

(56) References Cited

U.S. PATENT DOCUMENTS

| | | | | |
|---|---|---|---|---|
| 6,687,627 B1 * | 2/2004 | Gunn et al. | | 702/61 |
| 6,745,138 B2 * | 6/2004 | Przydatek et al. | | 702/61 |
| 6,760,845 B1 | 7/2004 | Cafarelli et al. | | 713/201 |
| 6,963,972 B1 * | 11/2005 | Chang et al. | | 713/153 |
| 7,320,008 B1 * | 1/2008 | Colgrove | | 1/1 |
| 7,792,787 B2 * | 9/2010 | Sincaglia et al. | | 707/607 |
| 8,176,174 B2 * | 5/2012 | Kagan | | 709/224 |
| 8,176,319 B2 * | 5/2012 | Osmond et al. | | 713/165 |
| 8,289,801 B2 * | 10/2012 | Smith et al. | | 365/228 |
| 2002/0007456 A1 * | 1/2002 | Peinado et al. | | 713/164 |
| 2002/0023209 A1 * | 2/2002 | Domstedt et al. | | 713/160 |
| 2003/0009401 A1 * | 1/2003 | Ellis | | 705/35 |
| 2003/0120928 A1 * | 6/2003 | Cato et al. | | 713/176 |
| 2004/0120262 A1 | 6/2004 | Hirose et al. | | 370/252 |
| 2004/0172207 A1 * | 9/2004 | Hancock et al. | | 702/60 |
| 2006/0052958 A1 * | 3/2006 | Hancock et al. | | 702/60 |
| 2006/0206433 A1 * | 9/2006 | Scoggins | | 705/63 |
| 2007/0016802 A1 * | 1/2007 | Wingert et al. | | 713/193 |
| 2007/0192352 A1 * | 8/2007 | Levy | | 707/102 |
| 2009/0070447 A1 * | 3/2009 | Jubinville et al. | | 709/223 |
| 2010/0095114 A1 * | 4/2010 | Greene et al. | | 713/160 |

OTHER PUBLICATIONS

International Search Report mailed Jun. 25, 2012 issued in corresponding International Patent Application No. PCT/US2011/054158 (3 pages).
Written Opinion mailed Jun. 25, 2012 issued in corresponding International Patent Application No. PCT/US2011/054158 (6 pages).
Last Pass User Manual: What is Last Pass? Introduction, Nov. 5, 2010, 2 pages. http://lastpass.com/help.php?fromwebsite=1.

* cited by examiner

*Primary Examiner* — Andy Rao
*Assistant Examiner* — Shan Elahi
(74) *Attorney, Agent, or Firm* — Nixon Peabody LLP

(57) ABSTRACT

A monitoring system includes at least one monitoring devices coupled to electrical power distribution system at selected locations for collecting data related to the operation of the monitored system. The monitoring device(s) includes a communication port and processors programmed to segment the collected data into blocks optimized for user analysis operations, encrypt the segmented blocks of data, bundle the encrypted blocks of data with unencrypted metadata that identifies the data blocks by at least the monitoring location at which the encrypted blocks of data were obtained and the type of data, and transmit the encrypted blocks of data with the unencrypted metadata. The system includes at least one client device that has a communication port that is coupled to the monitoring device(s) and the client device and that has a processor programmed to generate and transmit queries regarding selected ones of the encrypted blocks of data.

18 Claims, 2 Drawing Sheets ns by using the unencrypted metadata supplied by the monitoring devices 10.

SYSTEM AND METHOD FOR HOSTING ENCRYPTED MONITORING DATA

FIELD OF THE INVENTION

The present invention relates to a monitoring system hosted by a service provider that receives and stores encrypted monitoring data from clients and/or client devices, without having access to unencrypted or decrypted data values, for later retrieval in response to clients' requests.

BACKGROUND OF THE INVENTION

Monitoring systems hosted by a service provider can free end users from the complexity and cost of installing and managing their own systems. One primary concern of potential customers of hosted monitoring systems, however, is the potential loss of privacy inherent in storing data with another organization. Such customers are concerned that their data may become public, whether through accident or a digital attack, and this concern is a barrier to greater adoption of the more efficient hosted monitoring system model.

SUMMARY

According to one embodiment, a monitoring system includes multiple monitoring devices coupled to a monitored system at selected locations for collecting data related to the operation of the monitored system. The multiple monitoring devices include communication ports and processors programmed to segment the collected data into blocks optimized for user analysis operations, encrypt the segmented blocks of data, bundle the encrypted blocks of data with unencrypted metadata that identifies the data blocks by at least the monitoring locations at which the encrypted blocks of data were obtained and the type of data, and transmit the encrypted blocks of data with the unencrypted metadata. The system includes at least one client device that has a communication port that is coupled to the monitoring devices and that has a processor programmed to generate and transmit queries regarding selected ones of the encrypted blocks of data. A monitoring service is coupled to the monitoring devices and the client device and includes a processor programmed to receive and store the encrypted blocks of data with the unencrypted metadata from the monitoring devices, process the unencrypted metadata, and retrieve and transmit the selected ones of the encrypted blocks of data in response to the queries from the client device.

The monitoring service receives, stores and presents encrypted data, but the service provider has no access to unencrypted data values, or may have access only to summary data values. The customers hold the digital keys used to encrypt the data values (at the source, e.g., in a monitoring device) and to decrypt such data (performed at the local client level).

The monitoring service acquires, processes, stores and serves monitoring data to a customer, but that data is encrypted and not accessible to the hosting organization that is the service provider. The customers' monitoring devices encrypt data before sending it, and encrypted data served up by the hosting organization is seamlessly decrypted by a client device such as a customer's computer or mobile device.

In one implementation, the monitored system is an electrical power distribution system, and the monitoring devices are power monitors.

BRIEF DESCRIPTION OF THE DRAWINGS

The invention will be better understood from the following description of preferred embodiments together with reference to the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
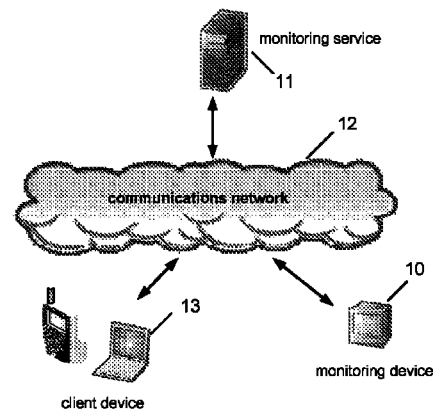
FIG. 1 is a diagrammatic view of a monitoring system using a monitoring service to host encrypted monitoring data.

The monitoring system shown in FIG. 1 includes at least one monitoring device 10 such as the power monitors used in electrical power distribution systems to monitor and temporarily store multiple parameters such as current, voltage etc. Each monitoring device 10 is capable of (a) segmenting data into blocks optimized for common user analysis operations, and (b) encrypting these segmented data blocks. The monitoring device 10 also bundles each encrypted data block with unencrypted metadata that describes the block using indices such as monitoring location, customer reference ID, monitoring device ID, description of data in the block, etc. Examples of monitoring devices include power meters, intelligent electronic devices (IEDs), protection relays, remote terminal units (RTUs), and fault recorders.

A monitoring service 11 is coupled to the monitoring device 10 through a communications network 12 to receive encrypted data blocks (bundled with metadata) and store the encrypted data for later retrieval. The monitoring services 11 may index the unencrypted metadata to speed retrieval of selected encrypted data blocks in response to a client request.

A client device 13 that requests a subset of the data stored by the monitoring service 11, receives the encrypted data blocks containing the requested data subset, and decrypts the data before presenting it to the user. Examples of client devices include standard desktop and laptop computers, and advanced mobile devices that include web browsers.

All the monitoring system components include communication ports so that they can be connected together via the communications network 12, and portions of this integrated network may include local and wide area networks, the Internet, the global telephone network and wireless cellular networks.

Figure 2:
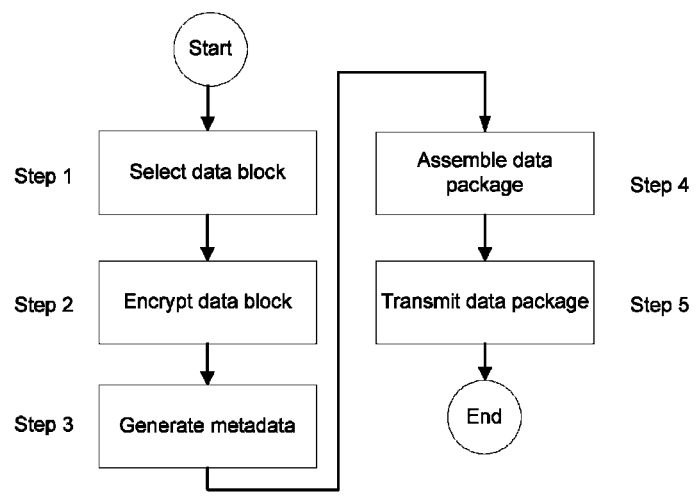
FIG. 2 is a flow chart of a routine executed by a processor in the monitoring device in the system of FIG. 1 for processing monitoring data.

FIG. 2 is a flowchart illustrating a routine executed by a processor in the monitoring device 10 to organize monitoring data into packages that are sent to the monitoring service 11. In step 1, a block of data is selected from the set of data stored by the monitoring device 10, where the criteria for data selection typically includes consideration of common user analysis operations. In a traditional monitoring system, the server stores "plaintext" data (information a sender wishes to transmit to a receiver), and can sort and aggregate such data in response to queries from the client device 13. The monitoring service 11 hosts only encrypted data, and can only retrieve and serve encrypted blocks in response to client device queries. For this reason, common user analysis operations are taken into consideration when selecting blocks of data. In one implementation, data blocks are segmented by time/date range. As an example, a user may wish to view several key measurements from one monitoring device 10 on a weekly basis, so that monitoring device may be configured to create data blocks containing the key measurements on a weekly basis.

Data block selection may also include consideration of both (a) the processing power and time required for the monitoring device 10 to encrypt a data block, and (b) the time required to decrypt a data block on the client device 13. For example, if too large a data block is selected, the processing power and time required by the monitoring device 10 may interfere with other time-critical tasks it needs to accomplish. In a similar fashion, very large blocks may take more time to decrypt on the client device 13 than user expectations (and patience) will tolerate.

In step 2, the monitoring device 10 encrypts the selected data block using an encryption algorithm. For example, the monitoring device 10 may use a method of public key encryption (such as PGP, or Pretty Good Privacy) to encrypt the selected data block using a public key such that only the matched private key can be used to decrypt the data block.

In step 3, the monitoring device 10 generates metadata that describes the data block and can be used by the monitoring service to organize and index stored data blocks such that they can be easily retrieved in response to queries from client devices. This metadata is purposely kept in plaintext form so that the monitoring service 11 can process it. Examples of metadata that may be generated by the monitoring device 10 include identification of data in the data block (e.g., time and date range of the data, measurement included, etc.), identification of the monitoring device and its owner, monitoring location, identification of the load being monitored, etc. Optionally, the monitoring device 10 may also calculate useful aggregations and statistics for the measurement data included in the data block and include this summary data along with the other metadata generated. As an example, the monitoring device 10 may scan the data block and calculate the minimum, maximum and average values for each measurement included in the block, along with a count of the number of values for each measurement.

In step 4, the monitoring device 10 assembles the encrypted data block and associated plaintext metadata into a data package for transmission to the monitoring service 11. The monitoring device 10 may also apply a digital signature to the data package, allowing the client devices 13 to later verify that data packages received from the monitoring service 11 are from the monitoring device they claim to be. As an example, the monitoring device 10 may use a private key to generate the digital signature, and the client devices 13 may use the matched public key to verify the authenticity of received data packages.

Finally, in step 5, the monitoring device 10 transmits the data package to the monitoring service 11, either in response to a request from the monitoring service 11 or of its own accord. As an example, the monitoring device 10 may be configured to transmit data packages at periodic time intervals (e.g., every hour), and/or when specific events occur (e.g., when a measurement value exceeds a predetermined threshold), and/or in response to a query from the monitoring service 11. The monitoring service 11 may be configured to accept transmissions from all monitoring devices 10, or it may be configured to accept only authenticated transmissions from authorized monitoring devices. As an example, the monitoring device 10 may be configured to include a unique authentication key (identifier) when transmitting data packages to the monitoring service 11, and the monitoring service 11 may be configured to only accept transmissions with valid authentication keys.

Figure 3:
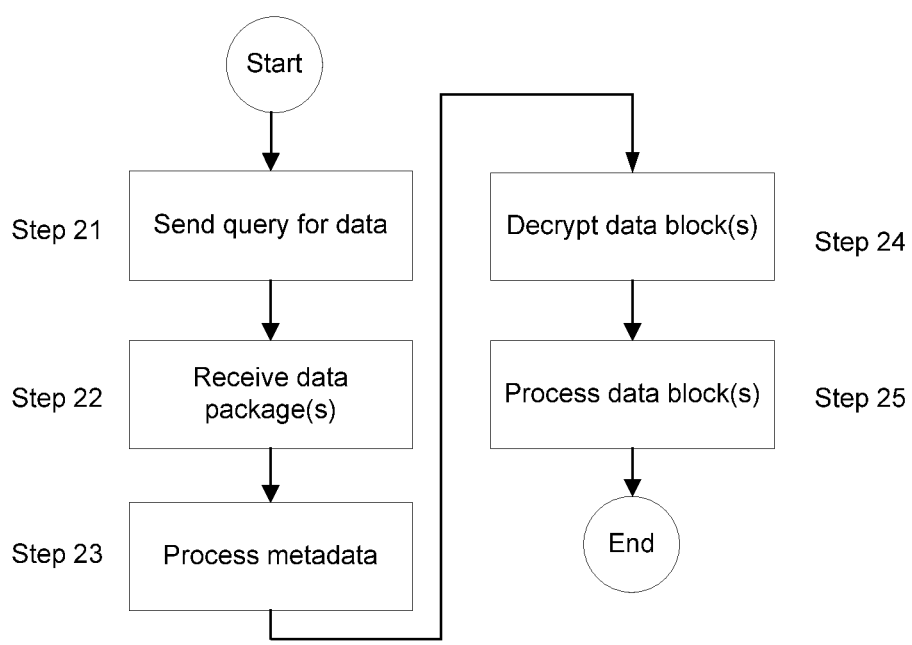
FIG. 3 is a flow chart of a routine executed by a processor in the client device in the system of FIG. 1 for processing encrypted data from the monitoring service.

FIG. 3 is a flowchart illustrating a routine executed by the client device 13 to receive, decrypt and consume information. In step 21, the client device 13 sends a query for data to the monitoring service 11. Since the only unencrypted data held by the monitoring service 11 is contained in the plaintext metadata included in stored data packages, the terms used in the query must match parameters contained in the metadata. For example, if the metadata includes monitoring device ID, monitoring device owner ID, a list of measurements included in each encrypted data block, and the time and date range for data within each encrypted data block, then the monitoring service 11 can successfully retrieve and serve data packages in response to queries containing those parameters.

In step 22, the client device 13 receives one or more data packages from the monitoring service 11 that match the query sent in step 21. If no data packages match the query sent in step 21, the monitoring service 11 sends a "no matching data" message to the client device 13. If the received data packages were signed by their associated monitoring device 10 with a digital signature, the client device 13 verifies the authenticity of the data packages and confirms that they originated from the monitoring device identified in the data packages.

In step 23, the client device 13 processes the metadata associated with each received data package. The client device 13 may use this metadata for tasks such as organizing encrypted data blocks within each data package in preparation for decryption. The client device 13 also uses this metadata to determine how to present data from the data block once it is decrypted. As an example, the client device 13 scans the metadata in a number of received data packages to find all data blocks from a single monitoring device 10 for a date range spanning multiple data blocks. As another example, if the metadata contains summary statistics that characterize the measurement values contained within the received data blocks, the client device 13 may scan the metadata of several data packages to find the highest maximum of a particular measurement and then further process just the data package containing that highest maximum.

In step 24, the client device 13 decrypts one or more data blocks contained within received data packages using a decryption method matching the encryption method used by the monitor(s) that transmitted the data package(s). If different encryption methods have been used to encrypt the data blocks received by the client device 13, the client device supports the associated decryption methods to extract the plaintext data from the encrypted data blocks.

Finally, in step 25, the client device 13 processes the decrypted data blocks previously extracted from the received data packages. The plaintext data from one or more data blocks may simply be organized for presentation to a user (e.g., as a table or chart), or calculations may be performed on the plaintext data before presentation to a user. The client device 13 also combines plaintext data from data blocks with metadata when compiling a display for a user. Alternatively, the client device 13 may execute instructions to further process the plaintext data without any user interaction. By way of example, the client device 13 may be a computer with a user interface that allows a user to create a query for the monitoring service 11. If a user submits a query for kW demand values from the monitoring device 10 that were captured during the previous two weeks, the monitoring service 11 responds with two data packages (one for each week) containing the data requested. The client device 13 checks the digital signature on each data package and confirms that both originated from the identified monitoring device. The client device 13 also processes the metadata within each data package and confirms that it contains the measurement (kW demand) and date range of interest. The client device 13 decrypts the data block contained within each data package, generates a time series chart of the kW demand values, and presents the chart to the user.

In one embodiment, the client device 13 is a computer with a web browser capable of natively executing a scripting language (e.g., JavaScript). A user logs into a web site associated with the monitoring service 11 and is presented with a web page that allows the user to create a query for monitoring data that is associated with the user. The web site can also provide the software program (written in the scripting language) required to decrypt data blocks received from the monitoring service 11. The digital keys required to decrypt the data may already be located on the client device 13, or they might themselves be hosted as an encrypted "keychain" by the web site, requiring the user to enter a pass phrase to decrypt the keychain. If the keychain approach is used, the decryption is preferably handled locally on the client device 13 within the web browser using the scripting language—the web site is never aware of the plaintext version of the keys within the keychain. Once the plaintext data has been extracted from the data blocks, the web browser can be directed to present the data in any one of a number of forms to the user.

A monitoring system may incorporate both encrypted and plaintext measurement data as required. If a particular measurement is already publicly available (such as weather data for a specific geographic location), the monitoring service 11 may simply store the measurement data in plaintext form. A monitoring device 10 may be configured to only encrypt "sensitive" measurements and provide other measurements in plaintext form to the monitoring service 11. Even when a particular measurement is deemed to be "sensitive", it may be that summary statistics of the measurement over a longer time span do not require the same level of privacy. In this case, the monitoring device 10 may be configured to encrypt data blocks with individual measurement values but offer summary statistics for the same measurement as plaintext. In any case, a monitoring system offering a blend of encrypted and plaintext measurement data optimizes the balance between privacy of data and flexibility of the monitoring service 11 to process stored data. This balance can be adjusted to reduce the risk that a potential attacker can leverage observed patterns between any plaintext data associated with encrypted data to decrypt encrypted data blocks.

Local client software that requests a subset of the data stored by the monitoring service 11, receives the encrypted data blocks containing the data subset of interest, and decrypts the data before presenting it to the user. This local client software may simply be web pages (served by the hosted service) that leverage the capabilities of modern web browsers to perform the decryption step in real time, using the digital key known to the user (but not the monitoring service).

In a modified embodiment, the metadata for each encrypted data block also contains key summary data that the monitoring service can use to perform calculations. As an example, the metadata for a block of energy interval data may contain the sum of the energy intervals within the block. This approach allows the monitoring service to perform useful measurement calculations in advance, speeding up responses to client requests in exchange for a controlled, partial loss of data privacy.

In another modified embodiment, homomorphic encryption is used to encrypt the data, allowing the hosted service to perform calculations on the measurement data without first decrypting it. Homomorphic encryption is a form of encryption where a specific algebraic operation is performed on the plaintext, and another (possibly different) algebraic operation is performed on the encrypted data. Using this approach, the monitoring service can perform useful aggregations on the encrypted data and serve up the results in response to a client request, and the plaintext decrypted by the client device will contain the correct aggregation results.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A monitoring system comprising
    at least one monitoring device coupled to a monitored system at at least one selected location for collecting data related to the operation of said monitored system, said at least one monitoring devices including communication ports and processors programmed to
        segment the collected data into blocks optimized for user analysis operations,
        encrypt said segmented blocks of data,
        bundle the encrypted blocks of data with unencrypted metadata that identifies the data blocks by at least the monitoring locations at which the encrypted blocks of data were obtained and the type of data, and
        transmit said encrypted blocks of data with said unencrypted metadata,
    at least one client device having a communication port coupled to said at least one monitoring devices, said at least one client device having a processor programmed to generate and transmit queries regarding selected ones of said encrypted blocks of data, and
    a monitoring service coupled to said at least one monitoring device and said client device including a processor programmed to
        receive and store said encrypted blocks of data with said unencrypted metadata from said at least one monitoring device,
        process said unencrypted metadata, and
        retrieve and transmit said selected ones of said encrypted blocks of data with said unencrypted metadata in response to said queries from said client device.

2. The monitoring system of claim 1 which includes multiple monitoring devices.

3. The monitoring system of claim 1 in which said processor in said client device is programmed to decrypt said encrypted blocks of data, and to process said unencrypted metadata.

4. The monitoring system of claim 3 in which said processor in said client device is programmed to use said metadata to organize said encrypted blocks of data in preparation for decryption.

5. The monitoring system of claim 3 in which said processor in said client device is programmed to use said metadata to determine how to present said decrypted data.

6. The monitoring system of claim 1 in which said metadata identifies at least one of the time and date range of said encrypted blocks of data, the measurements included in said encrypted blocks of data, the monitoring device in which said encrypted blocks of data were obtained, and the load being monitored.

7. The monitoring system of claim 1 in which said processor in said at least monitoring device is programmed to calculate aggregations and statistics for the measurement data included in at least selected ones of said unencrypted metadata bundled with said encrypted blocks of data.

8. The monitoring system of claim 1 in which said monitored system is an electrical power distribution system, and said at least one monitoring device is a power monitor.

9. A monitoring method comprising
- in at least one monitoring device coupled to a monitored system at least one selected location, collecting data related to the operation of a monitored system, segmenting the collected data into blocks, encrypting said segmented blocks of data, bundling the encrypted blocks of data with unencrypted metadata that identifies the data blocks by at least the monitoring location at which the encrypted blocks of data were obtained and the type of data, and transmitting said encrypted blocks of data with said unencrypted metadata to a monitoring service,
- in said monitoring service, receiving and storing said encrypted blocks of data with said unencrypted metadata transmitted by said at least one monitoring device, processing said unencrypted metadata, and retrieving and transmitting said selected ones of said encrypted blocks of data in response to said queries for such encrypted blocks of data, and
- in at least one client device coupled to said at least one monitoring device and said monitoring service, generating and transmitting to said monitoring service queries for selected ones of said encrypted blocks of data stored by said monitoring service.

10. The method of claim 9 which includes multiple monitoring devices, and in which said client device and said monitoring devices are coupled via communication ports.

11. The method of claim 9 in which said encrypted blocks of data are decrypted and said unencrypted metadata is processed in said client device.

12. The method of claim 11 in which said encrypted blocks of data are organized, using said metadata, in preparation for decryption in said client device.

13. The method of claim 11 in which said metadata is used to determine how to present said decrypted data in said client device.

14. The method of claim 9 in which said metadata identifies at least one of the time and date range of said encrypted blocks of data, the measurements included in said encrypted blocks of data, the monitoring device in which said encrypted blocks of data were obtained, and the load being monitored.

15. The method of claim 9 in which aggregations and statistics for the measurement data included in at least selected ones of said unencrypted metadata bundled with said encrypted blocks of data are calculated in said at least one monitoring device.

16. The method of claim 9 in which said monitored system is an electrical power distribution system, and said at least one monitoring device is a power monitor.

17. The monitoring system of claim 1 which includes a communication network coupled to said at least one monitoring device, said at least one client device, and said monitoring service.

18. The monitoring method of claim 9 which includes a communication network coupled to said at least one monitoring device, said at least one client device, and said monitoring service.

\* \* \* \* \*